United States Patent
Brenner

[19]

[11] Patent Number: 6,050,088
[45] Date of Patent: Apr. 18, 2000

[54] MIXTURE DELIVERY DEVICE

[75] Inventor: Frank Brenner, Remseck, Germany

[73] Assignee: Robert Bosch GmbH, Stuttgart, Germany

[21] Appl. No.: 09/138,579

[22] Filed: Aug. 21, 1998

[30] Foreign Application Priority Data

Sep. 5, 1997 [DE] Germany .................. 197 38 859

[51] Int. Cl.$^7$ ...................................................... F01N 3/10
[52] U.S. Cl. .................. 60/303; 60/286; 60/301; 60/295; 239/553.3; 422/182
[58] Field of Search ............... 60/274, 286, 301, 60/303, 295; 239/553.3; 422/182, 183

[56] References Cited

U.S. PATENT DOCUMENTS

| 5,209,062 | 5/1993 | Vollenweider . | |
|---|---|---|---|
| 5,522,218 | 6/1996 | Lane et al. | 60/274 |
| 5,605,042 | 2/1997 | Stutzenberger | 60/286 |
| 5,606,856 | 3/1997 | Linder et al. | 60/286 |
| 5,628,186 | 5/1997 | Schmelz | 60/274 |

FOREIGN PATENT DOCUMENTS

| 0 586 913 A2 | 8/1993 | European Pat. Off. . |
| 0555746 | 8/1993 | European Pat. Off. . |
| WO98 28070 | 7/1998 | WIPO . |

*Primary Examiner*—Thomas Denion
*Assistant Examiner*—Binh Tran
*Attorney, Agent, or Firm*—Ronald E. Greigg; Edwin E. Greigg

[57] ABSTRACT

With known mixture delivery devices for introducing a reducing agent into an exhaust system of an internal combustion engine, a urea/water solution, with pressurized gas added, is introduced into an angled region of the exhaust system, upstream of a catalytic converter in order to produce the reduction of nitrogen oxides in the exhaust of the engine. With the new mixture delivery device, an annular spray body is incorporated into the exhaust system, which device has a continuous distributor conduit as well as spray conduits by way of which the mixture, which is supplied by a mixture conveying line and is comprised of pressurized gas and urea/water solution, is delivered to the exhaust flow upstream of the catalytic converter. The mixture delivery device is particularly suited for delivering a urea/water solution upstream of the catalytic converter in the exhaust system of a mixture-compressing, self-igniting internal combustion engine.

12 Claims, 2 Drawing Sheets

6,050,088

MIXTURE DELIVERY DEVICE

BACKGROUND OF THE INVENTION

The invention is directed to improvements in a mixture delivery device used on internal combustion engines. There is also the demand for a reduction of polluting exhaust components of internal combustion engines. For nitrogen oxide reduction in the exhaust of internal combustion engines, in particular mixture-compressing self-igniting internal combustion engines, a urea-water solution is introduced into the exhaust system of the engine upstream of a catalytic converter. In the catalytic converter, the introduced urea is converted by means of chemical reactions into ammonia, which brings about the reduction in nitrogen oxides. A similar mixture delivery device has already been disclosed (EP 0 586 913 A2), which is, however, only suitable for a mixture injection into a region of the exhaust system in which the exhaust system is angled.

OBJECT AND SUMMARY OF THE INVENTION

The mixture delivery device disclosed herein has as its principal object and advantage over the prior art that it can be used universally and can also be disposed in regions of exhaust systems in which the exhaust system is not angled, and as a result, an optimal position can be freely maintained in the axial spacing in relation to a catalytic converter. Furthermore, a homogeneous introduction of the mixture into the exhaust is assured.

Advantageous improvements and updates of the mixture delivery device are possible by means of the measures taken herein.

Another object of the invention is to embody the spray body as a closed ring and to embody the distributor conduit in the spray body as completely continuous over 360° as well as to dispose the spray conduits in the circumference direction of the distributor conduit at regular intervals from one another so that a uniform introduction of mixture into the flowing exhaust is produced.

Still another object of the invention is that the mixture conveying line feeds into the distributor conduit at an outflow opening and the cross sections of the spray conduits disposed the closest to the outflow opening are smaller than the cross sections of the spray conduits disposed farther away from the outflow opening. This produces an even distribution of the mixture to the spray conduits.

Yet another object of the invention is that in the circumferential direction of the distributor conduit, the spray conduits are disposed spaced apart from a projection of the outflow opening of the mixture conveying line into the distributor conduit, by means of which the mixture is distributed uniformly in both directions of the distributor conduit.

Yet a further object of the invention to dispose a guide element immediately upstream of each spray conduit protruding from the inner wall of the spray body into the exhaust, wherein in one embodiment, the guide element is comprised as a continuous ring with a guide wall that is inclined conically inward in the exhaust flow direction. This achieves the fact that the mixture enters from the spray conduits into the exhaust and does not get deposited on the inner wall of the spray body or the exhaust system.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
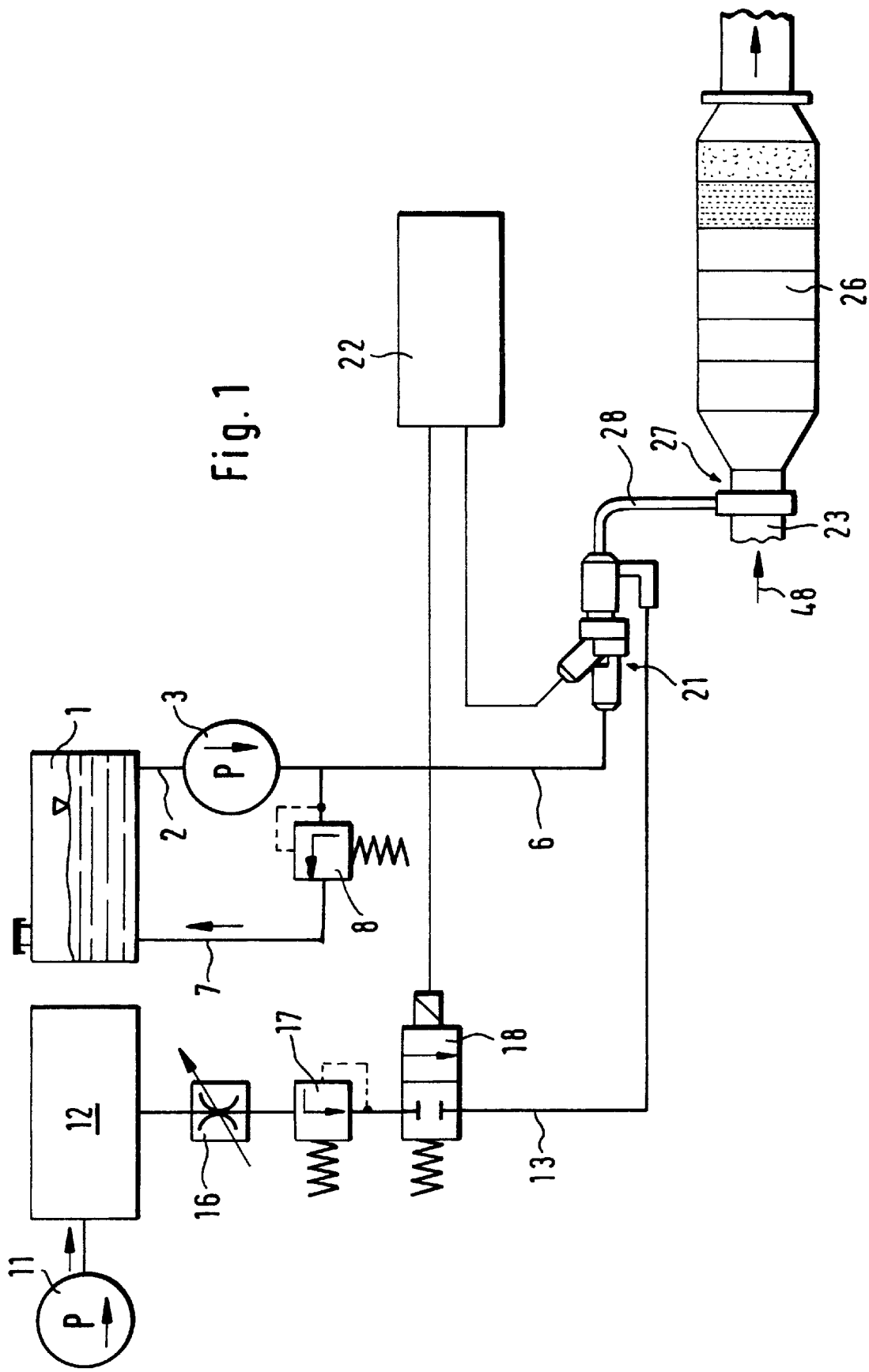
FIG. 1 shows a schematically represented urea metering device for an exhaust system of an internal combustion engine, with a mixture delivery device embodied according to the invention.

In the urea metering device according to FIG. 1, which is for delivery of a urea/water solution upstream of a catalytic converter in the exhaust system of an internal combustion engine, in particular a mixture-compressing, self-igniting internal combustion engine, a urea/water tank 1 is provided, from which an intake line 2 leads to the intake side of a pressure-generating urea delivery pump 3. The urea delivery pump 3 feeds a urea/water solution into a urea pressure line 6 connected to the pressure side of the delivery pump. From the urea pressure line 6, a relief line 7 leads back to the urea/water tank 1. A pressure limiting valve 8 is disposed in the relief line 7 and limits the pressure in the urea pressure line 6, for example to 3 bar.

The urea metering device furthermore has a gas pump 11 that supplies pressurized gas, for example at 7 bar, to a gas accumulator 12. The gas can, for example, be air, exhaust, or an inert gas. The gas accumulator 12 is likewise connected to a pressurized gas line 13 in which an adjustable throttle valve 16, a pressure regulating valve 17, and an electromagnetically actuatable 2/2-way valve 18 are disposed in series. The pressure regulating valve 17 regulates the downstream pressure in the pressurized gas line 13, for example to 1 bar. The 2/2-way valve 18 has an open position and a closed position, in which it is shown in FIG. 1.

The urea pressure line 6 and the pressurized gas line 13 are connected to a mixture metering valve 21 that can be electromagnetically actuated. A mixing of the urea/water solution with the pressurized gas occurs in this valve 21. The control of the 2/2-way valve 18 and the mixture metering valve 21 is carried out by means of an electronic control device 22. The mixture with the urea/water solution, which is uniformly and finely prepared by means of the pressurized gas, is injected into an exhaust system 23 upstream of a catalytic converter 26 of a known type by means of a mixture delivery device in the form of a spray body 27. The urea introduced into the catalytic converter 26 is converted by means of chemical reactions into ammonia, which produces the reduction in nitrogen oxide in the exhaust.

Figure 2:
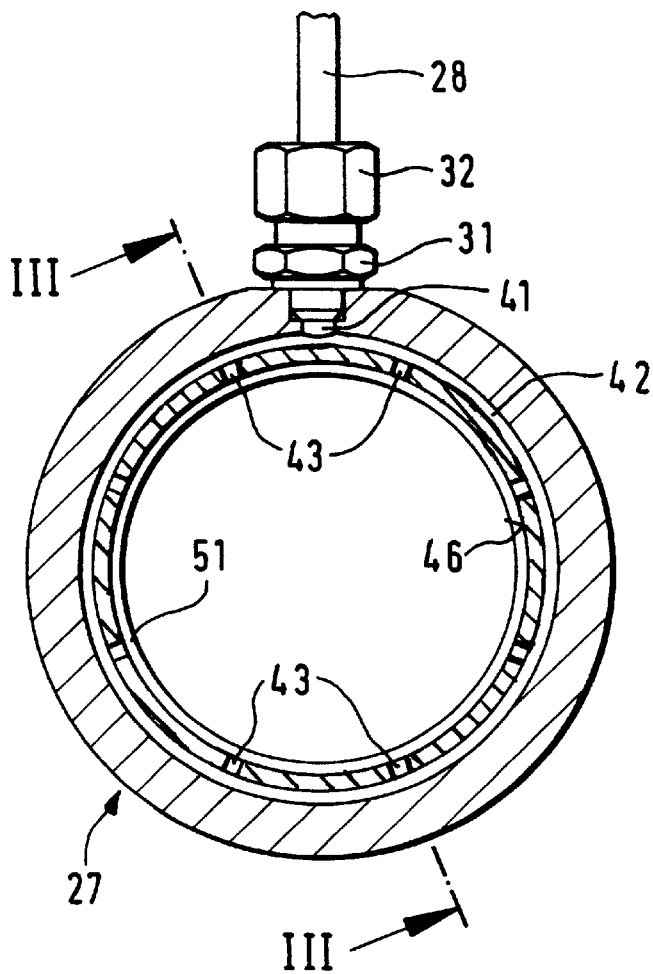
FIG. 2 shows a spray body, which is embodied according to the invention and belongs to a mixture delivery device for use in a urea metering device according to FIG. 1.

FIG. 2 shows a spray body 27 embodied according to the invention. A mixture conveying line 28 is provided between the spray body 27 and the mixture metering valve 21, for which a methanol-proof injection valve that is known in fuel injection can be used, for example an injection valve such as that disclosed by DE 34 11 537 A1. The mixture conveying line makes it possible to dispose the mixture metering valve 21 at a sufficient distance from the exhaust system 23 in order to thermally decouple the mixture metering valve 21 from the exhaust system 23. The spray body 27 has an entry fitting 31 provided with an external thread, to which a union nut 32 is screwed, which is coupled to the mixture conveying line 28. The spray body 27 is connected concentrically to the wall 37 (FIG. 3) of the exhaust system 23, upstream of the catalytic converter 26. The mixture conveying line 28 maintains a flow connection with a distributor conduit 42 by way of an outflow opening 41. The distributor conduit 42 extends in the spray body 27, which is at least partially embodied as a ring. If the spray body 27 is fully embodied as a ring, then the distributor conduit 42 extends inside the spray body as a continuous annular conduit, from which spray conduits 43 lead which are spaced at regular intervals from one another, extend in the radial direction, and lead to an inner wall 46.

Figure 3:
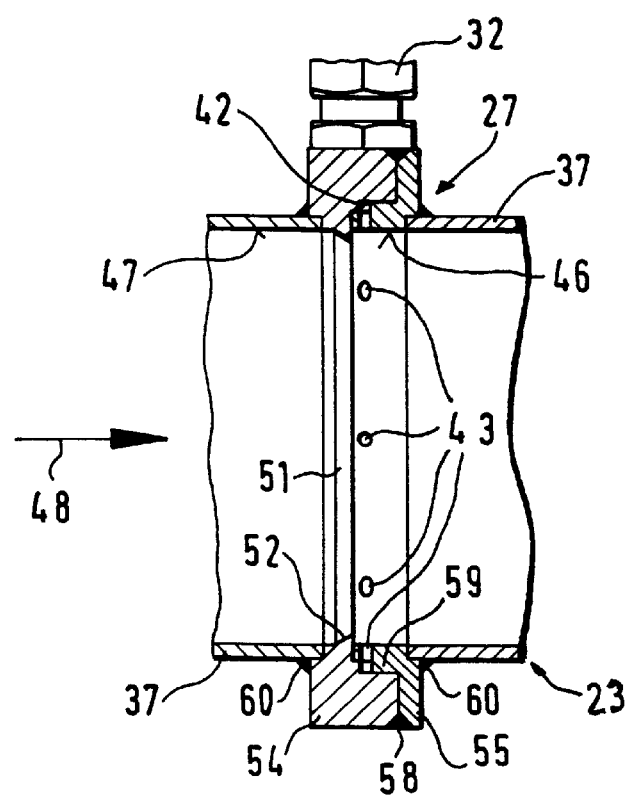
FIG. 3 shows a section along the line III—III in FIG. 2.

As best shown in FIG. 3, the inner wall 46 of the spray body 27 is flush with an inner wall 47 of the wall 37 of the exhaust system 23 so that the mixture emerging from the spray conduits 43 can, in a uniformly distributed state, enter into the exhaust flowing in the exhaust flow direction 48. In order to produce an even distribution of the mixture disposed in the distributor conduit 42 to the individual spray conduits 43, it is useful to embody the cross sections of the spray conduits 43 disposed closest to the outflow opening 41 of the mixture conveying line 28 as smaller than the cross sections of the spray conduits 43 disposed farther away from the outflow opening 41. At the same time, it is also suitable to dispose none of the spray conduits 43 in a projection of the outflow opening 41, i.e. aligned with the outflow opening 41, but to dispose them in the circumferential direction of the distributor conduit 42 spaced apart from the projection of the outflow opening 41 so that the mixture in the distributor conduit 42 is distributed evenly to the spray conduits 43 in both circumferential directions. In order to prevent deposits of the reducing agent from forming directly on the circular inner wall 46 of the spray body 27, it is suitable to dispose a guide element 51 immediately upstream of each spray conduit 43, which element, as is also shown in FIG. 3, protrudes from the inner wall 46 of the spray body 27 into the interior of the spray body so that the mixture emerging from the spray conduits 43 can initially emerge radially on the leeward side of the guide element 51 until it then travels into the exhaust flow 48. Individual, segment-shaped projections that extend in the circumferential direction only in the region directly upstream of each spray conduit 43 can serve as guide elements 51, but the guide element 51 can also be embodied as a continuous projection, as is shown in FIGS. 2 and 3. Like the individual guide elements, the guide element 51, which is represented in FIGS. 2 and 3 as a continuous ring, can also be embodied with a guide wall 52 that is inclined conically inward in the exhaust flow direction 48.

The spray body 27 can, for example, be composed of a first partial ring 54 and a second partial ring 55, whose side walls extending in the radial direction are respectively embodied as stepped so that the first partial ring 54 and the second partial ring 55 fit each other at these stepped side faces in order to form the spray body 27 and can be tightly assembled, for example by means of a completely continuous weld 58 in the contact region on the circumference. For example, the distributor conduit 42 that opens toward the circumference of a step 59 of the second partial ring 55, can be embodied in the step 59 and in the assembled state, this distributor conduit is covered by the first partial ring 54 and leading from it, the spray conduits 43 are likewise embodied in the second partial ring 55. The attachment of the spray body 27 to the exhaust system 23 can be carried out by means of welds 60, which respectively connect the wall 37 of the exhaust system 23 continuously to the spray body 27. In a manner not shown, however, the attachment of the first partial ring 54 to the second partial ring 55 of the spray body 27 as well as the connection of the spray body 27 to the wall 37 of the exhaust system 23 can also be carried out by means of a screw connection.

The foregoing relates to preferred exemplary embodiments of the invention, it being understood that other variants and embodiments thereof are possible within the spirit and scope of the invention, the latter being defined by the appended claims.

I claim:

1. A mixture delivery device for introducing at least one reducing agent into an exhaust system of an internal combustion engine, comprising a mixture conveying line that conveys a mixture of gas and at least one reducing agent to the exhaust system and ends in a spray body disposed in the exhaust system, the spray body (27) being comprised at least partially as a ring having a circular inner wall (46) to which spray conduits (43) lead and past which exhaust gas travelling through the exhaust system (23) flows, wherein the spray conduits (43) communicate with the mixture conveying line (28) by way of a distributor conduit (42) provided in the spray body (27).

2. The mixture delivery device according to claim 1, further comprising the spray body (27) is embodied as a closed ring and the distributor conduit (42) in the spray body (27) is embodied as completely continuous over 360°.

3. The mixture delivery device according to claim 1, further comprising the spray conduits (43) are spaced at regular intervals from one another in the circumferential direction of the distributor conduit (42).

4. The mixture delivery device according to claim 2, further comprising the spray conduits (43) are spaced at regular intervals from one another in the circumferential direction of the distributor conduit (42).

5. The mixture delivery device according to claim 1, further comprising the mixture conveying line (28) feeds through an outflow opening (41) into the distributor conduit (42) and the cross sections of the spray conduits (43) disposed closest to the outflow opening (41) are smaller than the cross sections of the spray conduits (43) disposed farther away from the outflow opening (41).

6. The mixture delivery device according to claim 2, further comprising the mixture conveying line (28) feeds through an outflow opening (41) into the distributor conduit (42) and the cross sections of the spray conduits (43) disposed closest to the outflow opening (41) are smaller than the cross sections of the spray conduits (43) disposed farther away from the outflow opening (41).

7. The mixture delivery device according to claim 1, further comprising the spray conduits (43) are disposed circumferentially spaced apart from a projection of the outflow opening (41) of the mixture conveying line (28) in the distributor conduit (42).

8. The mixture delivery device according to claim 2, further comprising the spray conduits (43) are disposed circumferentially spaced apart from a projection of the outflow opening (41) of the mixture conveying line (28) in the distributor conduit (42).

9. The mixture delivery device according to claim 1, further comprising a guide element (51) is disposed immediately upstream of each spray conduit (43) and protrudes from the inner wall (46) of the spray body (27).

10. The mixture delivery device according to claim 2, further comprising a guide element (51) is disposed immediately upstream of each spray conduit (43) and protrudes from the inner wall (46) of the spray body (27).

11. The mixture delivery device according to claim 9, further comprising the guide element (51) is embodied as a continuous ring with a guide wall (52) that is inclined conically inward in the exhaust flow direction (48).

12. The mixture delivery device according to claim 10, further comprising the guide element (51) is embodied as a continuous ring with a guide wall (52) that is inclined conically inward in the exhaust flow direction (48).

* * * * *